United States Patent Office 3,464,974
Patented Sept. 2, 1969

3,464,974
STARCH DERIVATIVES
Robert E. Gramera, Hinsdale, and David H. Le Roy, North Riverside, Ill., assignors to Corn Products Company, New York, N.Y., a corporation of Delaware
No Drawing. Filed Mar. 13, 1967, Ser. No. 622,387
Int. Cl. C08b *19/04;* D21h *3/28*
U.S. Cl. 260—233.3
10 Claims

ABSTRACT OF THE DISCLOSURE

Covers starch derivatives comprising starch having substituted thereon an ethyleniminyl radical, and particularly where such radical is a terminal ring group substituted on starch. Also covers method of making said compounds under specified conditions by reaction of ethylenimine with a carbonyl starch such as a keto starch, or aldehyde starch or an unsubstituted starch material.

---

The starch industry is continually searching for new derivatives, and particularly those which have a reactive functional group. One specific area of endeavor in this overall technical area lies in attempts to produce starch derivatives having a substantially greater degree of reactivity than starch itself. These materials may then have a greater spectrum of utility than starch in a number of areas. For example, these compounds may be useful as cross-linking agents, as additives to impart wet and dry strength properties to paper by addition to pulp during the wet-end step of the paper process, as improved paper and textile sizing agents, as dye assistants in the textile and other areas, as graft polymers, etc.

It would be particularly beneficial to prepare a starch derivative capable of use in the just-mentioned technological areas and others, which, in addition had the potential of rendering a treated system cationic in character. Moreover, if such new starch derivative could be structurally controlled as to its reactivity, such as for use as a latent cross-linker, this material would be quite attractive due to both versatility of use, and excellent performance in promoting the various end-uses. If these and other objects could be accomplished via treatment of various systems with the novel starch derivatives, and yet such derivatives could be easily and economically prepared, the synthesized starch materials and their mode of preparation would be a distinct advance in the starch field.

It therefore becomes an object of the invention to prepare a new starch derivative.

Another object of the invention is to prepare a novel starch derivative containing nitrogen, which when reacted with other chemicals, or used to treat various substrates, would thereby impart cationic character to the substrate or be capable of producing a new cationic product.

Still another object of the invention is to provide a starch derivative containing a ring nitrogen group.

In yet another object of the invention, a simplified method of producing the above starch derivatives is provided.

A specific object of the invention is to provide starch derivatives containing an ethyleniminyl radical.

A still further object of the invention is to provide a starch derivative containing an ethyleniminyl radical as a terminal substituent group.

Other objects will appear hereinafter.

In accordance with the invention, we have discovered a new starch derivative comprising starch having substituted thereon an ethyleniminyl radical. Preferred starch derivatives of this type contain said radical as a terminal substituent group, that is, the starch side chain is terminated by an aziridine ring.

Typical starch derivatives of the invention are represented by the following structural formula:

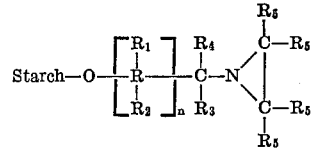

where R is an alkylene radical, usually containing 1–4 carbon atoms, or an alkenylene radical, usually of 2–5 carbon atoms, the carbon atoms of which may be substituted by groups represented by $R_1$ and $R_2$ which are selected from the group consisting of hydrogen, alkyl, cycloalkyl, substituted alkyl, alkenyl, alkanol, cycloheteryl, aralkyl, and aryl, $R_3$ is the same as $R_1$ and $R_2$, $n$ is an integer of one or greater and usually 1–4, $R_4$ is either hydrogen or hydroxy and $R_5$ is selected from the group consisting of hydrogen and lower alkyl radicals. $R_5$ when present as an alkyl radical usually contains 1–4 carbon atoms and most often is methyl.

Greatly preferred starch derivatives may be represented by the following structural formula:

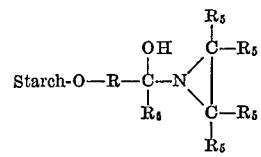

where R is a radical selected from the group consisting of alkylene, alkenylene, hydroxy substituted alkylene and hydroxy substituted alkenylene radicals containing 1–5 carbon atoms, and $R_5$ and $R_6$ are selected from the group consisting of hydrogen and lower alkyl radicals. Usually $R_5$ and $R_6$, when alkyl, contain 1–3 carbons and $R_5$ is most often methyl when present as an alkyl radical. Representative starch derivatives falling within the above formula are as follows: N-(1-hydroxy, 2-starchoxy ethyl) aziridine; N-(1-hydroxy, 2-starchoxy propyl)propylenimine; N-(4-starchoxy, 2-butenyl)aziridine and; N-(1,2-dihydroxy, 3-starchoxy)aziridine.

The amount of ethyleniminyl radical present in the starch derivatives of the invention may vary quite widely without departing from the scope thereof. Thus, the starch derivative may comprise a starch unit having substituted thereon at least a small but detectable amount of said ethyleniminyl substitutent group. Thus, the D.S. (degree of substitution) may range as low as stated above to as high as 3.0 in terms of an average figure based on the anhydroglucose unit present in starch. More preferred products have a D.S. ranging from about 0.001 to about 3.0, and most preferably ranging from about 0.001 to about 0.5.

The starch may have more or less than 1 of its 3 reactive hydroxyl groups of each individual anhydroglucose units so reacted to yield the just described starch derivatives of the invention. Likewise, the reaction may occur on any one or more of the three hydroxyl radicals present. However, according to the present understanding in the art, the 6 position hydroxyl group in the unit is the most reactive; the hydroxyl group at the 2 position is considered to be the next most reactive, and the hydroxyl group at the 3 position appears to be the least reactive. Moreover, the 6 position hydroxyl group usually will undergo a more extensive substitution or addition than the hydroxyls at the 2 and 3 positions, but it may be otherwise. Irrespective of the actual sequence or the number of units involved, the general formula above is intended to represent the products of this invention wherein the ethyleniminyl substitution may occur to various degrees of substitution at all or less than all α-D-glucopyranose units in the starch, and at one or more of the hydroxyl groups in a given unit.

If the starch reactant contains only carbonyl or hydroxy function or both hydroxy and carbonyl functions, the above discussion regarding possible degree of substitution of the final nitrogen product also holds equally true. In case of a starch molecule containing more than one function, the order of reactivity is as follows: aldehyde, hydroxy and keto.

In order to form the starch derivatives of the invention, starch, or starch containing keto or aldehyde groupings is reacted with ethylenimine. In addition to starch itself, a preferred starch reactant has the following structural formula:

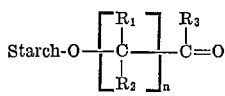

wherein $R_1$, $R_2$ and $R_3$ are taken from the groups consisting of hydrogen, alkyl, cycloalkyl, substituted alkyl, alkanol, cycloheteryl, alkenyl, aralkyl or aryl groups, and $n$ is 1 or greater, usually up to about 4. If $R_3$ is hydrogen, the derivative is, of course, an aldehyde ether; if $R_3$ is other than hydrogen, the product is a keto ether. These keto and aldehyde ethers are well known, and need little elaboration.

In some cases the starch reactant may contain a plurality of keto or aldehyde groups in one side-chain off the basic starch unit. The invention is also applicable here in that by reaction of the starch with ethylenimine, the resultant starch derivative may contain a starch substituent group having two or more ring nitrogen groups in the same chain.

The reaction of starch or the above carbonyl starches with ethylenimine may be effected in the presence of a solvent such as water, acetone, alcohol, etc. or even by heat treatment of a starch mixed with ethylenimine in the absence of solvent. However, it is greatly preferred that water be the solvating medium. Again, the synthesis may be carried out either at or below room temperature or at elevated temperatures. The preferred range of temperature runs from about 0° C. of about 25° C., and more preferably ranges from about 10° C. to about 20° C. The reaction is usually completed in ½–24 hours, and more often in 1–4 hours.

The reaction itself is base-catalyzed and under optimum conditions the pH of the reaction mixture should range from about 7 to about 12, more preferably is 7–9, and most preferably ranges from about 7.5 to about 8.5.

If run in a solvent, the solids content of the starch being reacted with ethylenimine may vary over a wide range, say about 10% by weight up to about 60%.

Depending upon the desired degree of substitution, the molar ratio of ethylenimine to starch may vary widely. In the usual case the ratio may range from about 1:10 to about 10:1 moles of ethylenimine per mole of starch. The molecular weight of the starch derivative is calculated as based on the molecular weight of an anhydroglucose group undergoing reaction. In case of a carbonyl substituted starch the molecular weight is, of course, dependent upon the molecular weight of the substituted anhydroglucose unit, which can be calculated knowing the D.S. and molecular structure of the substituent group.

The starch derivatives defined above are useful chemical intermediates, and as well are additives useful without further modification in various industries, such as, in for example, the leather, paper, adhesives and coating industries. As an example, the ethyleniminyl starch derivatives are paper wet and dry strength agents. These starches are also reacted with polymeric materials, such as polysaccharides (e.g. starch propionamide), soluble proteins, synthetic polyamides, polyvinyl alcohol, polyvinyl pyrrolidone, polyvinyl acetates, etc. to form soluble films. Again the derivatives are extremely useful as dye assistants in the textile industry, or as finishing agents in that same area of technology.

The hydrogen derivatives are capable of imparting cationic properties to substrates being treated, or, may react with other chemicals to yield a product cationic in character. In these cases the ring opens during reaction or application to the material being treated such as a textile to yield a basic nitrogen group.

The ethyleniminyl starch derivatives are particularly useful as latent cross-linking agents. The cross-linking may be catalyzed by any Lewis acid catalyst such as zinc fluoroborate.

The following examples illustrate preparations of typical ethyleniminyl starches of the invention. It is understood, of course, that these examples are merely illustrative, and the invention is not to be limited thereto.

The D.S. used to characterize these derivatives or starch starting carbonyl starches was determined by preparing the appropriate oximes therefrom and analyzing by the method outlined in Rochas and Gavet, "Bull. Inst. Textile France," 19 (1960).

EXAMPLE I

Preparation of N-(1-hydroxy,2-starchoxy ethyl) aziridine

To a three-neck, round bottom reaction vessel (0.5 liter capacity) was added water (180 ml.), starch glycoaldehyde either (1 mole) having a degree of substitution (D.S.) of 0.0633, and sodium chloride (0.5 mole). The reaction mixture was stirred and cooled to 7°–10° C., before ethylenimine (0.2 mole) was slowly added over a 1-hr. period. After the reaction was stirred overnight, below 20° C., the aqueous mixture was filtered. The wet starch cake was washed with water (1 liter), acetone (0.5 liter) and air dried. The product, N-(1-hydroxy, 2-starchoxy ethyl)aziridine, was obtained as a nonhygroscopic dry white powder and analyzed as follows:

*Analysis.*—Calcd.: N, 0.53%. Found: N, 0.52%. Reaction efficiency, 98%. D.S., 0.0620.

Oximation of a portion of N-(1-hydroxy,2-starchoxy ethyl)aziridine gave a product which upon analysis showed no significant increase above 0.52% in total bound nitrogen; indicative that the aldehydo group in the starting compound, starch glycoaldehyde ether, had reacted to give the expected aminohydrin starch derivative.

The reaction sequence is as follows:

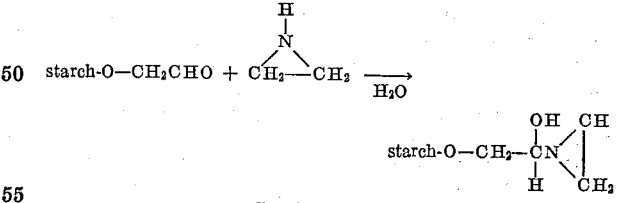

EXAMPLE II

Preparation of N-(1-hydroxy,2-starchoxy propyl) propylenimine

A slurry, consisting of granular starch glycoaldehyde ether (1 mole), which had a D.S. of 0.0633, sodium chloride (0.5 mole) and water (180 ml.) was stirred and cooled to 7°–10° C. in a three-neck round bottom flask (0.5 liter capacity). Propylenimine (0.18 mole) was slowly added over a 1-hr. period to the aqueous mixture which was further stirred overnight below 20° C. After filtration of the slurry the wet starch cake was washed with water (1 liter), acetone (0.5 liter) and air dried. The product, N-(1-hydroxy,2-starchoxy propyl)propylenimine, was obtained as a non-hygroscopic dry white powder and analyzed as follows:

*Analysis.*—Calcd.: N, 0.52%. Found: N, 0.50%. Reaction efficiency, 96%. D.S., 0.0597.

Oximation of a portion of N-(1-hydroxy,2-starchoxy propyl)propylenimine gave a product which upon analysis showed no significant increase in total bound nitrogen above 0.50%. This further indicated that the starting compound had reacted with propylenimine to give the expected aminohydrin starch derivative.

The reaction squence is as follows:

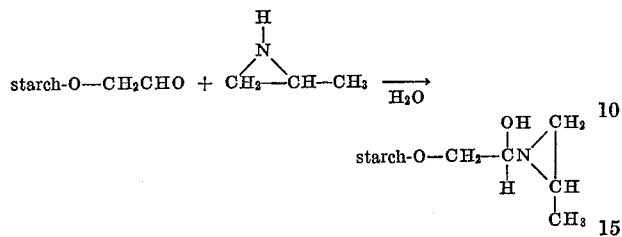

EXAMPLE III

Preparation of N-(4-starchoxy,2-butenyl)aziridine

Acid modified granular corn starch (1 mole) was dispersed into water (180 ml.) containing sodium sulfate (0.35 mole) and sodium hydroxide (0.10 mole). The alkaline slurry was cooled to 15° C., followed by a slow addition of N-(4-chloro,2-butenyl)aziridine (0.07 mole). After the alkaline slurry was filtered, the wet starch cake was washed with water (2 liter), methanol (1 liter) and air dried. The product, N-(4-starchoxy,2-butenyl)aziridine, was obtained as a dry white powder and had the following analysis:

Analysis.—Calcd.: N, 0.41%. Found: N, 0.32%. Reaction efficiency, 78%. D.S., 0.0378.

$\gamma_{max.}^{KBr}$ 1650 for C=C

The reaction sequence is:

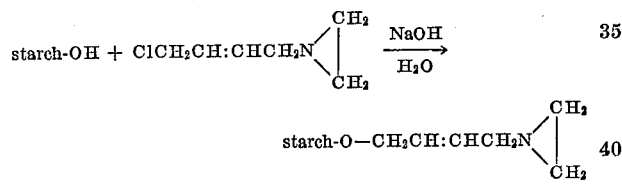

EXAMPLE IV

Preparation of N-(1,2-dihydroxy,3-starchoxy propyl)aziridine

To an alkaline slurry containing acid modified corn starch (1 mole), water (180 ml.), sodium sulfate (0.35 mole) and sodium hydroxide (0.10 mole) was added N-(1-hydroxy,2,3-epoxy propyl)aziridine (0.05 mole). The alkaline reaction mixture was stirred overnight at 25° C. After filtration, the wet starch cake was washed with water (2 liter), methanol (1 liter) and air dried. The product, N-(1,2-dihydroxy,3-starchoxy propyl)aziridine was obtained as a dry white powder and analyzed as follows:

Analysis.—Calcd: N, 0.42%. Found: N, 0.36%. Reaction efficiency, 86%. D.S., 0.0431.

The reaction sequence is:

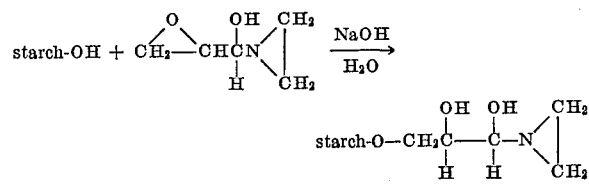

EXAMPLE V

This preparation was identical to Example III, with the exception that unmodified corn starch was employed instead of acid modified corn starch. Analysis of the product follows:

Analysis.—Calcd.: N, 0.41%. Found: N, 0.29%. Reaction efficiency, 70%, D.S., 0.0344

$\gamma_{max.}^{KBr}$ 1645 for C=C

EXAMPLE VI

This preparation was identical to Example IV, with the exception that unmodified corn starch was used in place of acid modified corn starch. The product analyzed:

Analysis.—Calcd: N, 0.42%. Found: N, 0.38%. Reaction efficiency, 91%. D.S., 0.0455.

EXAMPLE VII

Preparation of the aziridinyl derivative of dialdehyde starch

To a three-neck round bottom flask (0.5 liter capacity) was added water (180 ml.), 10% oxidized dialdehyde starch (1 mole) with a D.S. of 0.05 (as determined by reaction with hydroxylamine), and sodium chloride (0.5 mole). The reaction mixture was stirred and cooled to 7°–10° C. before ethylenimine (0.4 mole) was slowly added over a 1-hr. period. After the reaction slurry was stirred for an additional 10 hours below 20° C., the aqueous mixture was filtered. The wet starch cake was washed with water (1 liter) acetone (0.5 liter) and air dried. The aziridinyl derivative was obtained as a light tan dry powder and analyzed as follows:

Analysis.—Calcd: N, 0.41%. Found: N, 0.31%. Reaction efficiency, 75%. D.S., 0.0375.

The reaction sequence is:

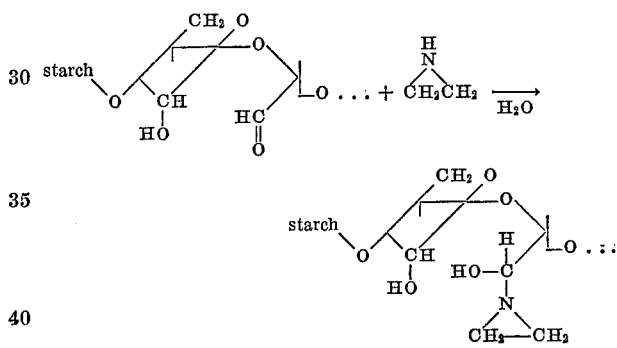

It should be noted that in this instance since one of the aldehyde groups actually exists predominantly in acetal form, only one aldehyde group reacts with the ethylenimine.

EXAMPLE VIII

This preparation was identical to Example VII, with the exception that propylenimine was substituted for ethylenimine. The product analysis was:

Analysis.—Calcd: N, 0.40%. Found: N, 0.28%. Reaction efficiency, 70%. D.S., 0.0338.

The starch that is used in practicing the invention may be derived from any vegetable source, and used as such or initially modified to introduce one or more carbonyl groups into the starch molecule which are reactive with the ethylenimine material. For example, corn, wheat, potato, tapioca, rice, sago and grain sorghum are useful starch maetrials. The waxy starches may also be used. The term "starch" is used broadly herein, and encompasses unmodified starch and tailings, and, as well, starch that has been modified by treatment with acids, alkalies, enzymes, or oxidizing agents. Soluble or partially soluble modified starches, dextrins, pregelatinized products, and starch derivatives are also suitable for use in the process.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

The invention is hereby claimed as follows:

1. A starch derivative having substituted thereon an ethyleniminyl ring which is represented by the following structural formula:

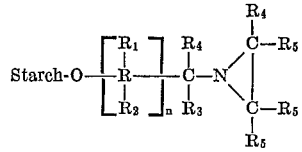

where R is a radical selected from the group consisting of alkylene and alkenylene, the carbon atoms of said radical being substituted by groups represented by $R_1$ and $R_2$ which are selected from the group consisting of hydrogen, alkyl, cycloalkyl, substituted alkyl, alkenyl, alkanol, cycloheteryl, aralkyl, and aryl groups, $R_3$ is the same as $R_1$ and $R_2$, $R_4$ is a radical selected from the group consisting of hydrogen and hydroxyl radicals, $R_5$ is a radical selected from the group consisting of hydrogen and lower alkyl radicals and $n$ represents an integer of at least one, said starch derivative having a degree of substitution of said ring of from about 0.001 to about 3.0.

2. A starch derivative represented by the following structural formula:

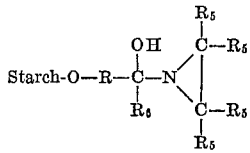

where R is a radical selected from the group consisting of alkylene, alkenylene, hydroxy substituted alkylene and hydroxy substituted alkenylene radicals containing 1–5 carbon atoms, and $R_5$ and $R_6$ are selected from the group consisting of hydrogen and lower alkyl radicals said starch derivative having a degree of substitution of the substituent shown of from about 0.001 to about 3.0.

3. N-(1-hydroxy, 2-starchoxy ethyl)aziridine having a degree of substitution of the recited substituent in the starch molecule of from about 0.001 to about 3.0.

4. N-(1-hydroxy, 2-starchoxy propyl)propylenimine having a degree of substitution of the recited substituent in the starch molecule of from about 0.001 to about 3.0.

5. N-(4-starchoxy, 2-butenyl)aziridine having a degree of substitution of the recited substituent in the starch molecule of from about 0.001 to about 3.0.

6. N-(1,2-dihydroxy, 3-starchoxy propyl)aziridine having a degree of substitution of the recited substituent in the starch molecule of from about 0.001 to about 3.0.

7. A starch derivative having the following structural formula:

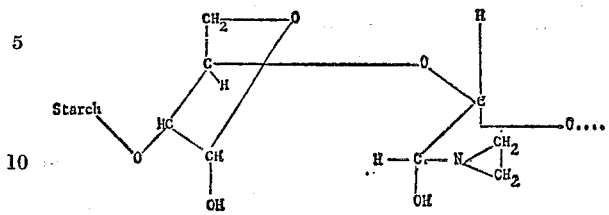

said starch derivative having a degree of substitution of the substituent shown of from about 0.001 to about 3.0.

8. A method of producing the starch derivative of claim 1 which comprises the step of reacting ethylenimine with a starch containing at least one functionality selected from the group consisting of hydroxy, ketone, and aldehyde, under basic conditions, and at a temperature of from 0° C. to 25° C. over a period of time ranging from about ½ hour to about 24 hours, and recovering said derivative.

9. The method of claim 8 wherein said reaction is carried out at a pH falling within the range of from about 7 to about 12.

10. The method of claim 9 wherein said reaction is effected in the presence of water as a solvating medium, at a pH falling within the range of from about 7 to about 9, and over a period of time falling within the range of from about 1 to about 4 hours.

References Cited

UNITED STATES PATENTS

| | | | |
|---|---|---|---|
| 3,331,833 | 7/1967 | Jarowenko | 260—233.3 |
| 3,329,672 | 7/1967 | Roberts | 260—233.3 |
| 3,146,228 | 8/1964 | Chance | 260—239 |
| 2,972,606 | 2/1961 | Hartman et al. | 260—91.3 |
| 2,933,367 | 4/1960 | Reeves et al. | 8—129 |
| 2,656,241 | 10/1953 | Drake et al. | 8—116.2 |
| 2,668,096 | 2/1954 | Reeves et al. | 8—115.5 |

OTHER REFERENCES

Whistler and Paschall: Starch; Chemistry and Technology, vol. I, pp. 470–72.

DONALD E. CZAJA, Primary Examiner

HOSEA E. TAYLOR, Jr., Assistant Examiner

U.S. Cl. X.R.

162—71, 72, 146; 260—9, 24

UNITED STATES PATENT OFFICE
CERTIFICATE OF CORRECTION

Patent No. 3,464,974 September 2, 1969

Robert E. Gramera et al.

It is certified that error appears in the above identified patent and that said Letters Patent are hereby corrected as shown below:

Column 3, line 43, "0° C of about" should read -- 0° C to about --. Column 4, line 28, "either" should read -- ether --; same column 4, line 52, the portion of the formula reading

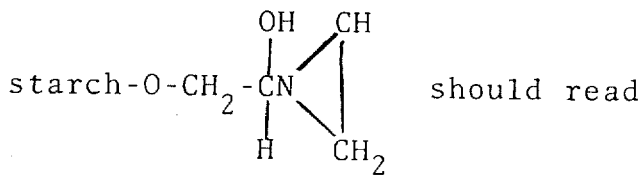  should read  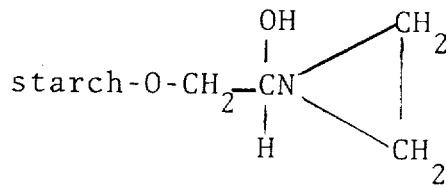

Column 6, line 59, "maetrials" should read -- materials --. Column 7, line 7, the formula should appear as shown below:

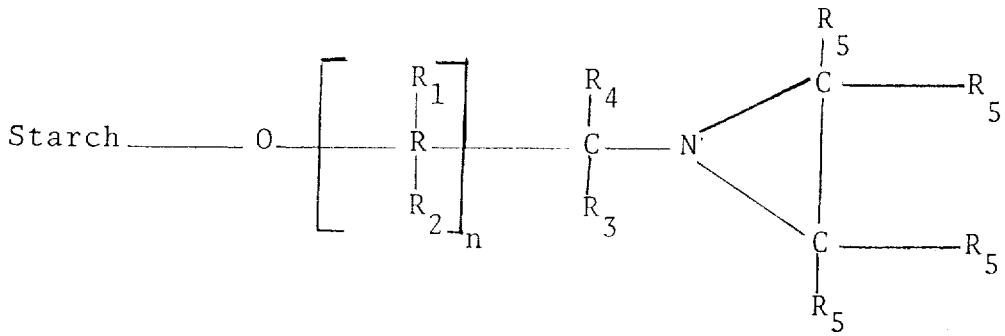

Signed and sealed this 26th day of May 1970.

(SEAL)
Attest:

EDWARD M. FLETCHER, JR.
Attesting Officer

WILLIAM E. SCHUYLER, JR.
Commissioner of Patents